United States Patent [19]

Tsujino

[11] 3,789,117

[45] Jan. 29, 1974

[54] PROCESS FOR THE PREPARATION OF ENTERIC MEDICAMENTS

[75] Inventor: Takuichi Tsujino, Tokyo, Japan

[73] Assignee: Freund Ind. Co., Ltd., Tokyo, Japan

[22] Filed: July 19, 1971

[21] Appl. No.: 164,115

[52] U.S. Cl............... 424/35, 117/166, 260/226, 260/231 A, 424/94

[51] Int. Cl. ... A01n 17/00, B44d 1/30, C08b 13/00

[58] Field of Search .............. 424/35; 117/166; 260/226, 231 A

[56] References Cited
UNITED STATES PATENTS 3,629,237  12/1971  Koyanagi et al. ............. 260/226

OTHER PUBLICATIONS

Ott et al., Cellulose and Cellulose Derivatives, 2nd Ed., Part III(1955), pages 1451, 1460.

*Primary Examiner*—Shep K. Rose
*Attorney, Agent, or Firm*—Richard C. Sughrue et al.

[57] ABSTRACT

An improved enteric coating for medicament less soluble in gastric juice or water is obtained by coating a medicament with an organic solvent-soluble cellulose derivative in which the hydrogen atom of one hydroxyl group has been substituted by a carboxymethyl group and at least one of other hydroxyl groups have been esterified or etherified.

7 Claims, No Drawings

PROCESS FOR THE PREPARATION OF ENTERIC MEDICAMENTS

BACKGROUND OF THE INVENTION

The present invention relates to a process for the preparation of enteric medicaments and more particularly to a process for the preparation of enteric medicaments less soluble in gastric juice or water by using a specific organic solvent-soluble cellulose derivative.

DESCRIPTION OF THE PRIOR ART

As a process for producing enteric medicaments, there is known a process in which medicaments are coated with a dibasic acid monoester derivative such as cellulose acetate phthalate or cellulose acetate succinate. By using such a cellulose derivative, a beautiful enteric coating can be quite readily obtained by employing an ordinary pan coating method or a fluidization process. However, when such a cellulose derivative is used for preparing enteric coating for some kinds of enzymes such as pancreatins, bromelin, trypsin, chymotrypsin, and the like, it sometimes happens that the enteric property of the coated medicament is lost with the passage of time during preservation. Furthermore, it is known that such enteric medicament is insolublized in artificial enteric juice of the pharmacopoeia or becomes soluble in artificial gastric juice. These problems are also described in the article "Recent Pharmaceutical Techniques" in Nippon Yakugyo Shinbun (Japan Pharmaceutical News) of Sept. 27, 1969.

This is believed to be cuased by the fact that the free carboxyl group of the cellulose derivative (e. g., phthalic acid when the cellulose derivative is cellulose acetate phthalate) is decomposed by an esterase or a medicament having a faculty of hydrolyzing it since the bond of the carboxyl group is by the ester linkage.

On the other hand, processes of producing medicaments by using the copolymers of unsaturated carboxylic acids or esters thereof, vinyl acetate, styrene, etc., are disclosed in Japanese Patent Publication Nos. Sho 37-11843, Sho 44-11916, and Sho 44-22834. However, since such a copolymer having vinyl bond has high tackiness and hence there is a tendency of causing sticking of tablets or stripping of coating during the coating operation, pin holes are readily formed and also it is difficult to form a sufficient coating. Such troubles by the tackiness are also described in "Film coating (2) for tablet"; in Yakkyoku (Pharmacy); Vol. 17, No. 7.

SUMMARY OF THE INVENTION

Therefore, an object of this invention is to provide a novel process of preparing enteric medicaments without accompanied with such troubles in conventional manners.

The object of this invention is attained by using, as the enteric coating material, an organic solvent-soluble cellulose derivative in which the hydrogen atom of a hydroxyl group has been substituted by a carboxymethyl group and at least one of the remaining hydroxyl groups have been esterified or etherified. The substitution degree of the carboxymethyl group in the cellulose derivative used in this invention is 0.3~1.2 per anhydrous glucose unit.

DETAILED DESCRIPTION OF THE INVENTION

The cellulose derivative used in this invention may also be shown by the general formula

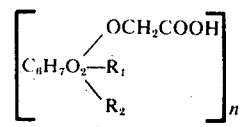

wherein $R_1$ and $R_2$ each represents a hydrogen atom or an esterified or etherified group, at least one of said $R_1$ and $R_2$, however, must be an esterified or etherified group.

Examples of the ester group include an acetic acid ester group, a propionic acid ester group, a butyric acid ester group, a nitric acid ester group, a higher fatty acid group, and the like and examples of the ether group include an alkyl ether group, a hydroxyalkyl ether group, and the like. The cellulose derivative of this invention has one or more such ester groups or ether groups as the substituents.

The practical examples of the cellulose derivative of this invention are carboxymethyl cellulose acetate, carboxymethyl hydroxypropyl cellulose acetate, carboxymethyl ethyl cellulose, and the like. Furthermore, for the purpose of providing plasticity and humidity resistance to the enteric medicaments, higher fatty acid ester derivatives such as carboxymethylcellulose stearic acid ester derivative are preferably used.

An enteric medicament is usually prepared by dissolving an enteric coating material in an organic solvent and coating a medicament with the solution. That is, the esterification or etherification by the introduction of groups R and R' is for solublizing the cellulose derivative in organic solvents and then the cellulose derivatives of this invention include the ester and ether derivatives of cellulose. In particular, the esterification gives no bad influences on the stability of the enteric medicament prepared.

The relations of the substitution rate of the carboxymethyl group in carboxymethyl cellulose acetate which is one of the cellulose derivatives in this invention and the solubilities of the carboxymethyl cellulose acetate in water, artificial gastric juice, and artificial enteric juice are shown in Table 1.

TABLE 1

| Substitution rate | Water | Artificial gastric juice | Artificial enteric juice |
|---|---|---|---|
| 0 | insoluble | insoluble | insoluble |
| 0.1 | do. | do. | do. |
| 0.2 | do. | do. | slightly swelled |
| 0.3 | do. | do. | collapsed |
| 0.4 | do. | do. | do. |
| 0.5 | do. | do. | dissolved |
| 1 | do. | do. | do. |
| 1.0 | do. | do. | do. |
| 1.1 | do. | do. | do. |
| 1.2 | do. | do. | do. |
| 1.3 | slightly swelled | do. | do. |
| 1.4 | swelled | slightly swelled | do. |
| 1.5 | do. | swelled | do. |

The coating materials used in this invention are readily dissolved in methanol, ethanol, isopropanol, ethyl acetate, benzene, toluene, dioxane, acetone, methylene chloride, trichloroethylene, trichloroethane, chloroform, etc., alone or a combination of them to provide clean and suitable coating material solutions having low viscosity. By coating tablets, pills, granules, powders, or the like of medicament with the solution according to an ordinary way, a uniform enteric coating which is stable to water and artificial gastric juice but is readily collapsed in artificial enteric juice is readily formed. The coating on the medicament thus obtained is tasteless and odorless and has excellent preservability, luster-keeping property, and humidity resistance.

The invention will, then, be described by referring to the following examples, in which the number following "carboxymethyl cellulose acetate" or carboxymethyl ethyl cellulose is the substitution degree of the carboxymethyl group.

EXAMPLE 1

| a: | | |
|---|---|---|
| Carboxymethyl cellulose acetate (0.7) | | 10 parts |
| Ethyl cellulose | | 1 part |
| Butylphthalybutyl glycolate | | 0.5 part |
| Titanium oxide | | suitable amount |
| 1 : 1 acetone-ethanol mixture to make 100 parts | | |

While stirring 1,000 g. of tablets each having a diameter of 9.0 mm. and a weight of 250 mg. and containing 200 mg. of bromelin in a rotary coating pan, the coating solution having the above composition was uniformly applied to the tablets and then the tablets are dried by air. By repeating the above procedure, coating of 150 microns in thickness was formed and thus the enteric medicament tablets having sufficient coatings were obtained.

| b: | | |
|---|---|---|
| Cellulose acetate phthalate (pharmacopoeia grade) | | 10 parts |
| Ethyl cellulose | | 1 part |
| Butylphthalybutyl glycolate | | 0.5 part |
| Titanium oxide | | suitable amount |
| 1 : 1 acetone-ethanol mixture to make 100 parts | | |

The solution having the above composition was applied to the bromelin-containing tablets as above by the same procedure as above to form enteric coating having the same thickness as above.

The coated medicaments obtained above using the solution (a) or the solution (b) were subjected to the collapse test by the method described in the Japan Pharmacopoeia with the passage of time by placing them in the states of 45°C. and 50 percent or 80 percent in relative humidity. The results are shown in Table 2, in which the time when the coating was collapsed in artificial gastric juice or artificial enteric juice are shown in minute.

TABLE 2

| | Relative humidity 50% | | | | Relative humidity 80% | | | |
|---|---|---|---|---|---|---|---|---|
| | (B) | | (C) | | (B) | | (C) | |
| (A) | (1) | (2) | (1) | (2) | (1) | (2) | (1) | (2) |
| 1 day | >180' | <5' | >180' | 5–7' | >180' | <5' | >180' | 5–7' |
| 7 days | >180' | <5' | >180' | 10–15' | >180' | <5' | >180' | 20–25' |
| 14 days | >180' | <5' | >180' | 20–30' | >180' | <5' | >180' | 40–60' |
| 21 days | >180' | <5' | >180' | 40–50' | >180' | <5' | >180' | 60–90' |
| 28 days | >180' | <5' | >180' | 60–90' | >180' | 5–7' | >180' | >90' |

(A): Period of time when the medicaments were placed under the above-said conditions; (B): Tablet coated by the solution (a) containing carboxymethyl cellulose acetate; (B): Tablets coated by the solution (b) containing cellulose acetate phthalate; (1): In artificial gastric juice; and (2): In artificial enteric juice.

EXAMPLE 2

The solution having the following composition was applied to tablets each having a diameter of 10 mm. and a weight of 360 mg. and containing 300 mg. of pancreation as in Example 1 to form an enteric coating of 150 microns in thickness on the tablet.

| Carboxymethyl ethyl cellulose (1.0) | 10 parts |
|---|---|
| Ethyl cellulose | 1 part |
| Polyethylene glycol 6000 | 0.5 part |
| Tartrazine | suitable amount |
| 1 : 1 acetone-isopropanol mixture to make 100 parts | |

When the coated medicaments were subjected to the collapse test of the Japan Pharmacopoeia, it was confirmed that the coated medicaments were stable and were not collapsed after 3 hours in gastric juice but were collapsed within 5 minutes in artificial enteric juice.

Furthermore, when they were placed for 30 days in the states of 45°C. and 80 percent in relative humidity and then subjected to the collapse test as in Example 1, they were stable and were not collapsed after placed in artificial gastric juice for 3 hours but were collapsed within 5 minutes in artificial enteric juice.

What is claimed is:

1. A process for the preparation of an enteric medicament, which comprises coating a medicament with an organic solvent solution of an organic solvent-soluble cellulose derivative of the formula:

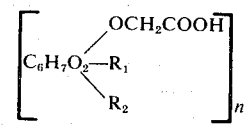

wherein at least one of said $R_1$ and $R_2$ must be a carboxy acid ester group, or an alkyl ether, or a hydroxy alkyl ether group, and the other one of said $R_1$ and $R_2$ is a hydrogen atom, the hydrogen atom of the hydroxyl group on the cellulose molecule being substituted with a carboxy methyl group having a degree of substitution ranging from 0.3 to 1.2 per anhydrous glucose unit.

2. The process of claim 1, wherein said cellulose derivative is a member selected from the group consisting of carboxymethyl, cellulose acetate, carboxymethyl hydroxypropyl cellulose acetate, carboxymethyl ethyl cellulose, and carboxymethyl cellulose stearic acid ester derivatives.

3. The process of claim 1, wherein said organic solvent is a member selected from the group consisting of methanol, ethanol, isopropanol, ethyl acetate, benzene, toluene, dioxane, acetone, methylene chloride, trichloroethylene, and chloroform.

4. The process of claim 1, wherein said medicament to be coated is an enzyme.

5. The process of claim 1, wherein the ester so formed is a member selected from the group consisting of an acetic acid ester group, a propionic acid ester group, a butyric acid ester group, and a higher fatty acid group.

6. The process of claim 1, wherein a nitric acid ester group replaces said carboxy acid ester group.

7. An enteric coated medicament prepared by the process of claim 1.

* * * * *